United States Patent
Terashima

(10) Patent No.: US 7,407,442 B2
(45) Date of Patent: Aug. 5, 2008

(54) STEERING SHAFT BOOT

(75) Inventor: Katsuya Terashima, Chiba (JP)

(73) Assignee: Kinugawa Rubber Ind. Co., Ltd., Chiba-shi (JP)

( * ) Notice: Subject to any disclaimer, the term of this patent is extended or adjusted under 35 U.S.C. 154(b) by 173 days.

(21) Appl. No.: 11/366,445

(22) Filed: Mar. 3, 2006

(65) Prior Publication Data

US 2006/0199653 A1 Sep. 7, 2006

(30) Foreign Application Priority Data

Mar. 4, 2005 (JP) ............................. 2005-059932

(51) Int. Cl.
*F16D 3/84* (2006.01)
(52) U.S. Cl. ...................... 464/173; 277/635
(58) Field of Classification Search ............ 74/18, 74/18.1, 18.2; 464/173–175; 277/634–636; 403/50, 51
See application file for complete search history.

(56) References Cited

U.S. PATENT DOCUMENTS 1,885,121 A * 11/1932 Loweke ................. 403/51 X
3,166,943 A * 1/1965 Simmen ..................... 403/50
4,840,386 A * 6/1989 Peitsmeier et al. .......... 277/636
6,056,297 A * 5/2000 Harkrader et al. .......... 277/634

FOREIGN PATENT DOCUMENTS

JP 08-198122 A 8/1996
JP 10-086701 A 4/1998

* cited by examiner

*Primary Examiner*—Greg Binda
(74) *Attorney, Agent, or Firm*—Foley & Lardner LLP

(57) ABSTRACT

A steering shaft boot of a molded elastic material comprises an inner boot portion including a first cylindrical portion that is adapted to cover a steering shaft, a first flange portion that extend radially outward from one axial end of the first cylindrical portion and is adapted to be secured to a panel member and a first upper wall portion that extends radially inward from the other axial end of the first cylindrical portion and is adapted to be put on an outer surface of the steering shaft; and an outer boot portion including a second cylindrical portion that covers the first cylindrical portion while keeping a certain clearance therebetween, a second flange portion that extends radially outward from one axis end of the second cylindrical portion and is adapted to be secured to the panel member and a second upper wall that extends radially inward from the other axial end of the second cylindrical portion to the other axial end of the first cylindrical portion. The first and second flange portions are separate members but engageable when in use.

10 Claims, 4 Drawing Sheets

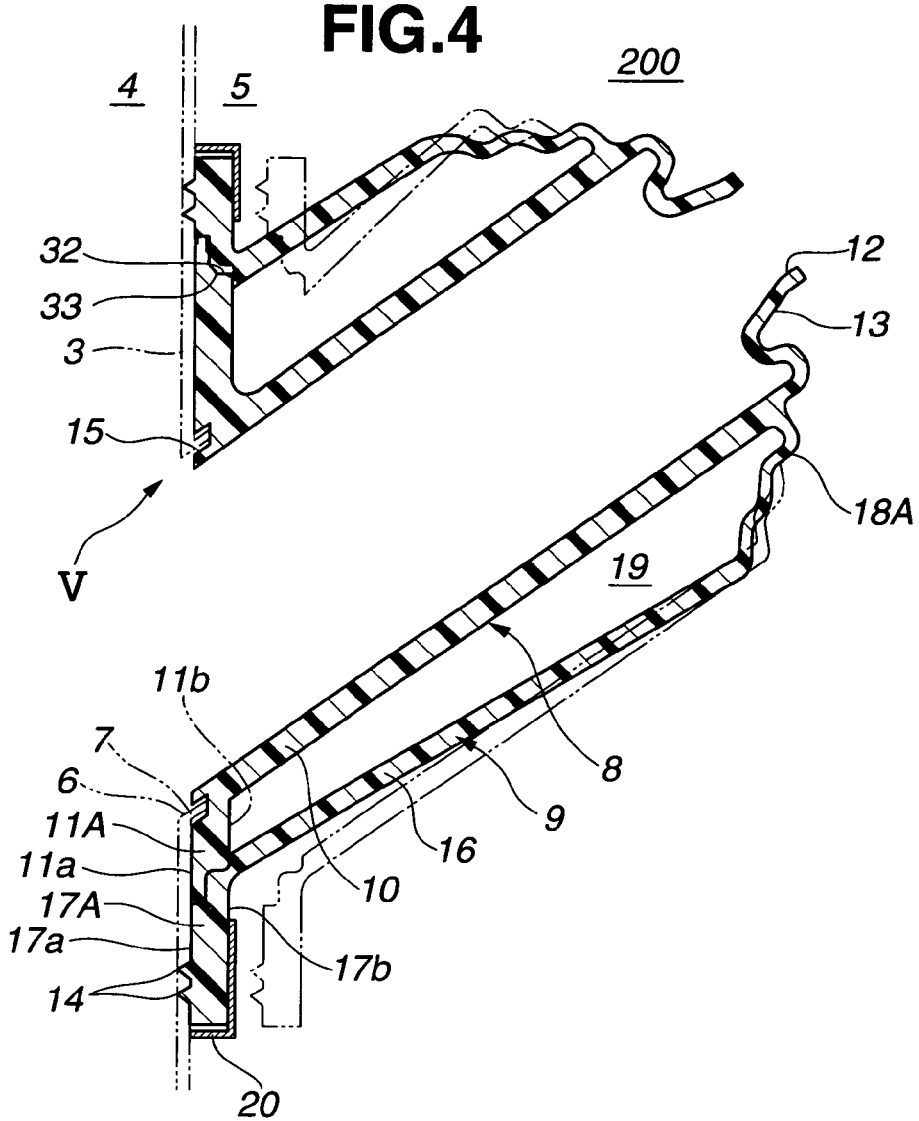
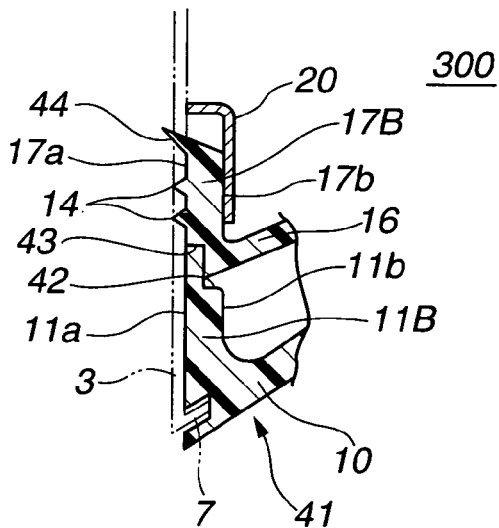

STEERING SHAFT BOOT

BACKGROUND OF THE INVENTION

1. Field of the Invention

The present invention relates to automotive steering shaft boots or covers, and more particularly to the steering shaft boots of a type that elastically holds a steering shaft to a dash panel of the vehicle in a manner to seal a steering shaft bore of the dash panel through which the steering shaft passes.

2. Description of the Related Art

Japanese Laid-open Patent Application (Tokkaihei) 8-198122 shows a steering shaft boot of the above-mentioned type. That is, the steering shaft boot of this published Application generally comprises a flange that is secured to a peripheral portion of the steering shaft bore of the dash panel, a holder that holds the steering shaft through a ball bearing, an inner rubber boot that extends from the flange to the holder and an outer rubber boot that also extends from the flange to the holder while covering the inner rubber boot. Due to provision of a so-called double layer boot unit constituted by the inner and outer rubber boots, the sealing of the steering shaft bore is assured.

SUMMARY OF THE INVENTION

However, in the above-mentioned steering shaft boot, the inner and outer rubber boots that constitute the double layer boot unit are separate parts, and thus, assembling the steering shaft boot and setting the same to a right position need a troublesome and time-consumed assembling and setting work. Furthermore, due to separate production of the inner and outer rubber boots, cost of the steering shaft boot is inevitably increased. Furthermore, due to the separate construction of the inner and outer rubber boots, the double layer boot unit has a higher possibility of having air permeable clearance between mutually mated portions of the inner and outer rubber boots particularly after long use. If such clearance appears, the sealing of the steering shaft bore is lowered.

It is therefore an object of the present invention to provide a steering shaft boot which is free of the above-mentioned drawbacks.

According to the preset invention, there is provided a steering shaft boot of molded resin that comprises inner and outer boot portions that are arranged to constitute a double layer boot unit, wherein respective parts of the inner and outer boot portions are integrally connected.

According to the present invention, there is further provided an arrangement that comprises a dash panel having an opening, a steering shaft passing through the opening and a steering shaft boot wherein the steering shaft boot is hermetically secured to dash panel while covering the steering shaft.

In accordance with a first aspect of the present invention, there is provided a steering shaft boot of a molded elastic material for use with a steering shaft that passes through an opening formed in a panel member. The steering shaft boot comprises an inner boot portion including a first cylindrical portion that is adapted to cover the steering shaft, a first flange portion that extend radially outward from one axial end of the first cylindrical portion and is adapted to be secured to the panel member and a first upper wall portion that extends radially inward from the other axial end of the first cylindrical portion and is adapted to be put on an outer surface of the steering shaft; and an outer boot portion including a second cylindrical portion that covers the first cylindrical portion while keeping a certain clearance therebetween, a second flange portion that extends radially outward from one axis end of the second cylindrical portion and is adapted to be secured to the panel member and a second upper wall that extends radially inward from the other axial end of the second cylindrical portion to the other axial end of the first cylindrical portion, wherein the first and second flange portions are separate members.

In accordance with a second aspect of the present invention, there is provided an arrangement which comprises a panel member having an opening; a steering shaft that passes through the opening of the panel member; a steering shaft boot of an elastic material, the steering shaft boot comprising an inner boot portion including a first cylindrical portion that covers the steering shaft, a first flange portion that extend radially outward from one axial end of the first cylindrical portion and is secured to the panel member and a first upper wall portion that extends radially inward from the other axial end of the first cylindrical portion and is put on an outer surface of the steering shaft, and an outer boot portion including a second cylindrical portion that covers the first cylindrical portion while keeping a certain clearance therebetween, a second flange portion that extends radially outward from one axis end of the second cylindrical portion and is secured to the panel member and a second upper wall that extends radially inward from the other axial end of the second cylindrical portion to the other axial end of the first cylindrical portion, the first and second flange portions being separate members; and a bracket secured to the panel member to define therebetween a pocket into which mutually contacting parts of the first and second flange portions are tightly received.

BRIEF DESCRIPTION OF THE DRAWINGS

Other objects and advantages of the present invention will become apparent from the following description when taken in conjunction with the accompanying drawings, in which:

FIG. 1A is an enlarged view of the part enclosed by circle indicated by arrow "A" of FIG. 1;

FIG. 4 is a view similar to FIG. 1, but showing a steering shaft boot of a second embodiment of the present invention;

FIG. 5 is a sectional view of an essential portion of a steering shaft boot which is a third embodiment of the present invention.

DETAILED DESCRIPTION OF THE EMBODIMENTS

In the following, embodiments 100, 200 and 300 of the present invention will be described in detail with reference to the accompanying drawings.

For ease of understanding, various directional terms, such as, right, left, upper, lower, rightward and the like are used in the following description. However, such terms are to be understood with respect to only a drawing or drawings in which a corresponding part or portion is shown. Throughout the specification, substantially same parts or portions are denoted by the same numerals.

Figure 1:
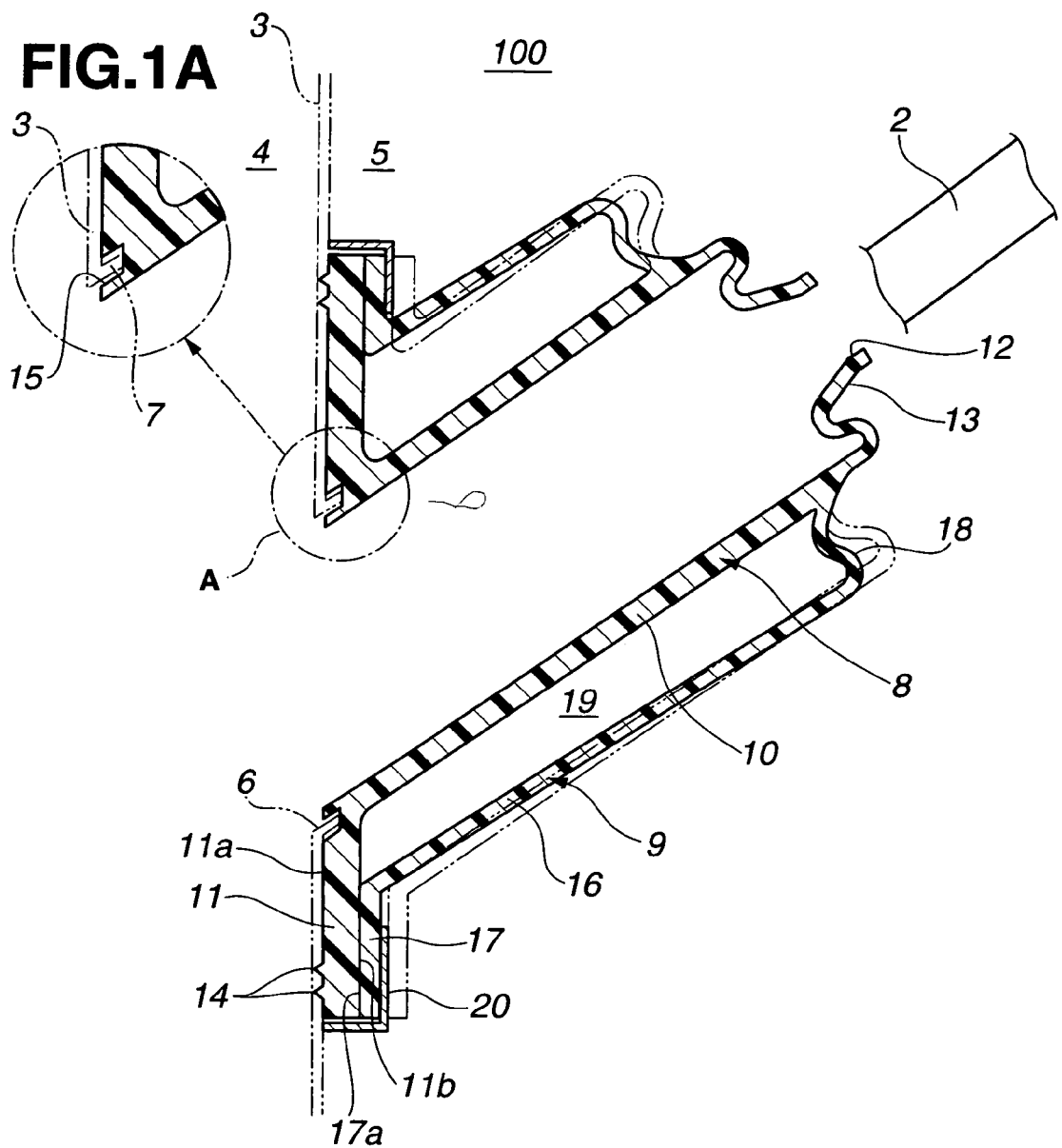
FIG. 1 is a sectional view of a steering shaft boot which is a first embodiment of the present invention.
Figure 2:
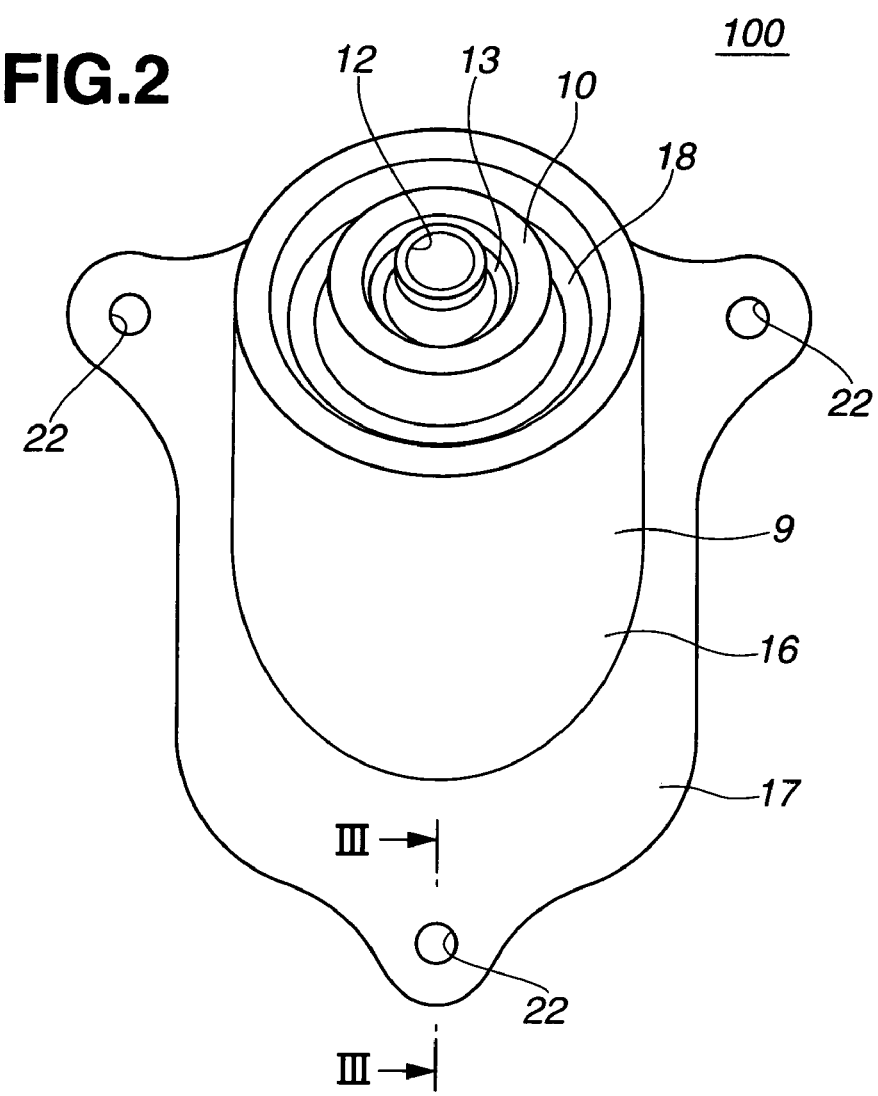
FIG. 2 is a perspective view of the steering shaft boot of the first embodiment of the present invention.
Figure 3:
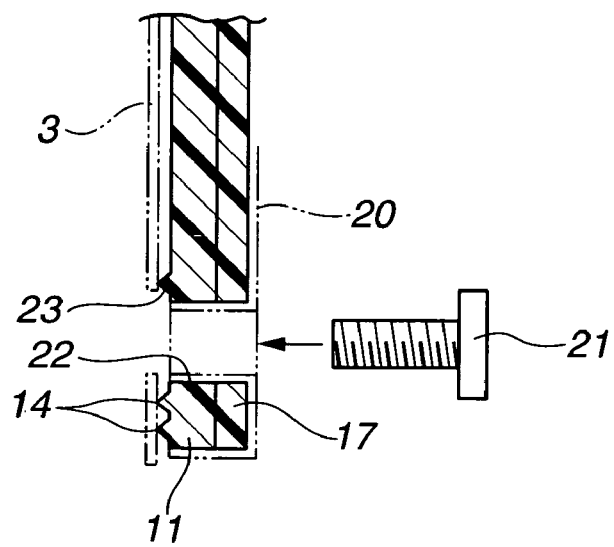
FIG. 3 is an enlarged sectional view taken along the line III-III of FIG. 2.

Referring to FIGS. 1 to 3 of the drawings, particularly FIGS. 1 and 2, there is shown a steering shaft boot or cover 100 which is the first embodiment of the present invention.

As is best understood from FIG. 1, the steering shaft boot 100 is arranged aslant to support a steering shaft 2 while sealing a clearance defined between the steering shaft 2 and a dash panel 3 through which the steering shaft 2 passes.

The dash panel 3 is a partition panel installed between an engine room 4 and a passenger cabin 5, and has a steering shaft bore 6 through which the steering shaft 2 passes. As shown, the steering shaft bore 6 is defined by an annular ridge 7 bent back from a major part of the dash panel 3 toward the passenger cabin 5.

It is to be noted that the steering shaft boot 100 is a molded one-body member made of an elastic material and generally comprises an inner boot 8 that covers the steering shaft 2 and an outer boot portion 9 that covers the inner boot portion 8 leaving a cylindrical clearance 19 defined therebetween. That is, the steering shaft boot 100 has a so-called double layer construction. Due to this double layer construction, the steering shaft boot 100 can exhibit a satisfied noise blocking performance against a noise that would be inevitably transmitted from the engine room 4 to the passenger cabin 5 as will become apparent as the description proceeds.

The steering shaft boot 100 is constructed of a soft thermoplastic resin or the like, such as a thermoplastic resin having a specific gravity ranging from about 1.4 to about 1.7.

For example, a polypropylene (PP) added with barium sulfate or an ethylene propylene dien monomer (EPDM) added with calcium carbonate may be used as the material.

As shown in FIG. 1, the inner boot portion 8 comprises generally a first cylindrical portion 10 that covers the steering shaft 2, a first flange portion 11 that extends radially outward from a lower end of the first cylindrical portion 10 and a first upper wall portion 13 that extends radially inward from an upper end of the first cylindrical portion 10 and has an annular opening 12 intimately put on the steering shaft 2.

The first cylindrical portion 10 has an inner diameter sufficiently larger than an outer diameter of the steering shaft 2. Thus, upon assembly, there is defined a cylindrical clearance between the inner surface of the first cylindrical portion 10 and the outer surface of the steering shaft 2. The first flange portion 11 is intimately put on a peripheral portion of the steering shaft bore 6 of the dash panel 3. A lower surface 11a of the first flange portion 11 is formed with two annular seal lips 14 and 14 that are pressed against the surface of the dash panel 3.

Furthermore, the lower surface 11a of the first flange portion 11 is formed with an annular groove 15 for receiving therein the above-mentioned bent back annular ridge 7 of the dash panel 3.

The first upper wall portion 13 is thinner than the first cylindrical portion 10 and has at radially opposed portions a generally S-shaped cross section. Due to this construction, the first upper wall portion 13 is constantly pressed against the outer surface of the steering shaft 2 to keep an intimate and hermetical contact therebetween.

The outer boot portion 9 covers the first cylindrical portion 10 of the inner boot portion 8 keeping a cylindrical clearance 19 therebetween.

As shown, the outer boot portion 9 is integral with the inner boot portion 8. More specifically, as will be described in detail in the following, the outer boot portion 9 extends from the upper end of the first cylindrical portion 10 of the inner boot portion 8 toward the first flange portion 11.

The outer boot portion 9 comprises generally a second cylindrical portion 16 that has a diameter larger than the first cylindrical portion 10 of the inner boot portion 8, a second flange portion 17 that extends radially outward from a lower end of the second cylindrical portion 16 and a second upper wall portion 18 that extends from an upper end of the second cylindrical portion 16 to the upper end of the first cylindrical portion 10 of the inner boot portion 8.

The second cylindrical portion 16 surrounds the first cylindrical portion 10 of the inner boot portion 8 defining the cylindrical clearance 19 therebetween. The second flange portion 17 has a lower surface 17a intimately put on an upper surface 11b of the first flange portion 11 of the inner boot portion 8. The second upper wall portion 18 of the outer boot portion 9 is thinner than the second cylindrical portion 16 and has a generally S-shaped cross section. Due to this construction, the second upper wall portion 18 has an elastically flexible structure.

As shown in FIG. 1, a bracket 20 is secured to the dash panel 3 for tightly connecting the steering shaft boot 100 to the dash panel 3. That is, the bracket 20 is secured to the dash panel 3 to define therebetween a pocket (no numeral) into which radially outer parts of the mutually contacting first and second flange portions 11 and 17 are tightly received.

As is seen from FIGS. 2 and 3, particularly FIG. 3, bolts 21 (three in the illustrated embodiment) are used for assuring the tight connection of the first and second flange portions 11 and 17 to the dash panel 3.

As shown in FIG. 3, each bolt 21 passes through a bolt opening 22 defined by four aligned openings (no numerals) formed in the bracket 20, the second flange portion 17, the first flange portion 11 and the dash panel 3. Although not shown, a nut is operatively engaged with the bolt 21. As shown in this drawing, the first flange portion 11 of the inner boot portion 8 is formed with a sub seal lip 23 that is shaped to surround the bolt opening 22 with the aid of a part of the inner annular seal lip 14. With this sub seal lip 23, undesired seal leakage which may occur due to presence of the bolt opening 22 is suppressed.

As is shown by a phantom line in FIG. 1, in a dismantled condition of the steering shaft boot 100 wherein substantially no stress is applied to the same, the second flange portion 17 of the outer boot portion 9 and the first flange portion 11 of the inner boot portion 8 are kept separated. That is, for this separate construction of the two boots 8 and 9, a core removing technique is used for molding the steering shaft boot 100. This will be well understood from the following description.

Figure 6:
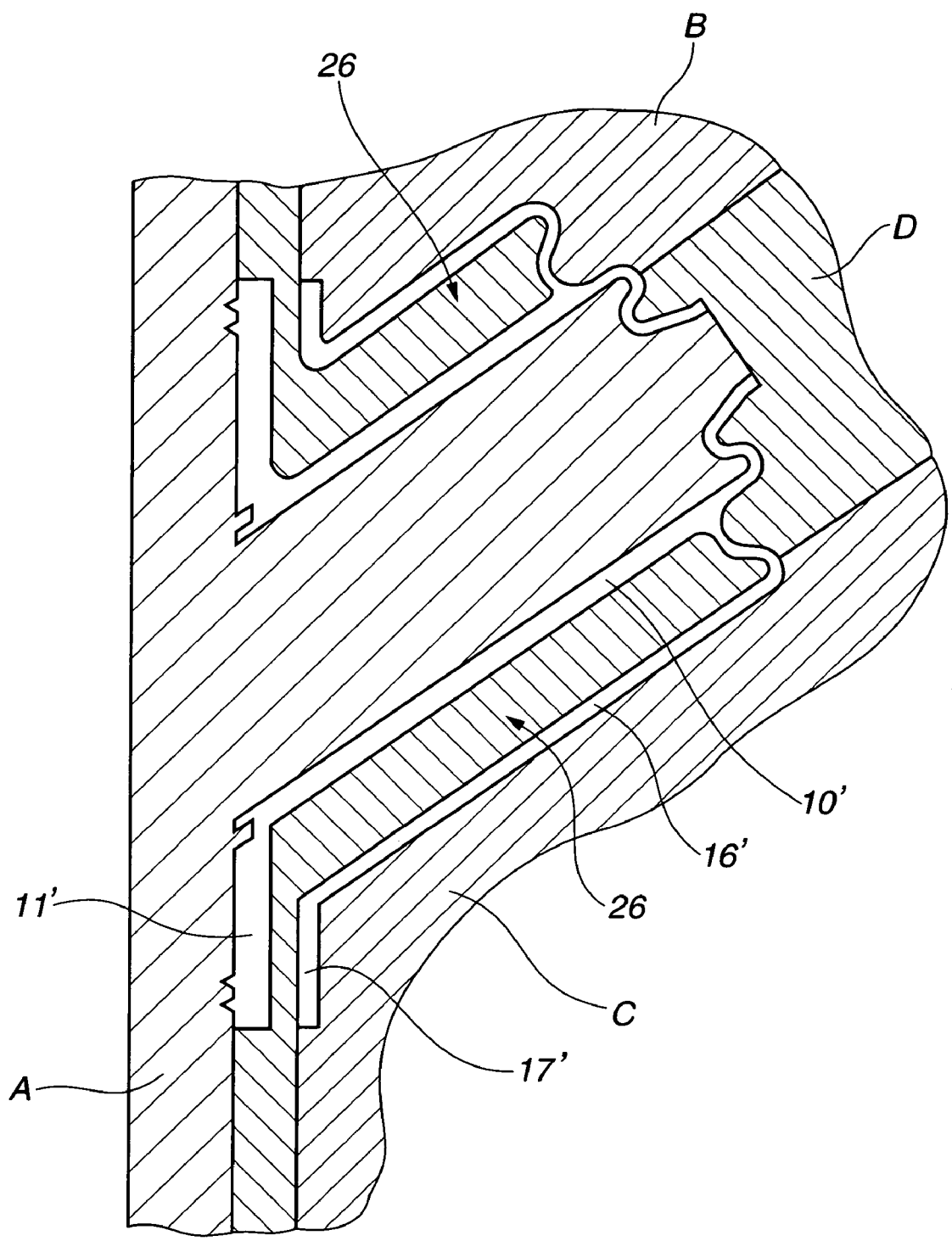
FIG. 6 is a sectional view of a split mold unit in a set condition by which the steering shaft boot of the present invention is molded.

FIG. 6 shows an essential portion of a split mold unit in a set condition by which the steering shaft boot 100 is produced or molded. The split mold unit generally comprises four outer dies A, B, C and D and one core 26. As shown, before molding, the four outer dies A, B, C and D are assembled in the illustrated manner and the core 26 is installed in a space defined by the four outer dies A, B, C and D. As shown, due to presence of the core 26, the space is divided into four major shaped spaces 10', 11', 16' and 17' which are connected in the illustrated manner. Upon molding, a pressurized fluid material of the above-mentioned thermoplastic resin is led into the four shaped spaces 10', 11', 16' and 17', and after certain curing or hardening of the material, the four outer dies A, B, C and D are dismantled. With this, the material in the four shaped spaces 10', 11', 16' and 17' forms the first cylindrical portion 10, the first flange portion 11, the second cylindrical portion 16 and the second flange portion 17 of the molded steering shaft boot 100 having the core 26 unstably left in the product, that is, the molded steering shaft boot 100.

Then, the core 26 is removed from the product 100. Due to the separate connection between the two shaped spaces 11' and 17' as is seen from FIG. 6, the first and second flange portions 11 and 17 thus produced are separately molded and thus easily flexed from each other, which allows the easy removal of the core 26 from the molded product 100. It is to be noted that the space in which the core 26 has been left forms the cylindrical clearance 19 of the product 100. As is described hereinabove, when it is intended to connect the steering shaft boot 100 to the dash panel 3, the first and second flange portions 11 and 17 are put on each other and press-fitted into the bracket 20. During this, the second upper wall portion 18 serves as a hinge means because of its elastic deformation.

As is described hereinabove, upon mounting to the dash panel 3 in the above-mentioned manner, the steering shaft boot 100 constitutes a so-called double layer construction that has an isolated cylindrical clearance 19 defined therein. It is to be noted that even though it has the isolated cylindrical clearance 19, the steering shaft boot 100 is of a one-body construction. Thus, production and assembly of the boot 100 are easily and economically carried out unlike the case of the above-mentioned conventional steering shaft boot.

As is seen from FIG. 1, for mounting the steering shaft boot 100 to the dash panel 3, the first and second flange portions 11 and 17 are press-fitted in the pocket of the bracket 20. Thus, the seal lips 14 and 14 of the first flange portion 11 are pressed against the dash panel 3 thereby assuring a sealing of the first flange portion 11 to the dash panel 3, that is, an acoustical separation between the engine room 4 and the passenger cabin 5. Furthermore, due to the double layer construction of the boot 100, a satisfied noise blocking against a noise transmittance from the engine room 4 to the passenger cabin 5 is much assured. Furthermore, usage of the thermoplastic resin of the specific gravity from 1.4 to 1.7 as the material of the boot 100 promotes the noise blocking performance of the boot 100.

Furthermore, due to provision of the bent back annular ridge 7 of the dash panel 3 and the annular groove 15 of the first flange portion 11, the positioning of the boot 100 relative to the dash panel 3 is easily achieved.

Referring to FIG. 4, there is shown a steering shaft boot 200 which is the second embodiment of the present invention.

Since the boot 200 of this embodiment is similar to the above-mentioned boot 100 of the first embodiment, only parts or portions that are substantially different from those of the first embodiment 100 will be described in the following. The substantially same parts and portions as those of the first embodiment 100 are denoted by the same numerals and detailed explanation of such same parts and portions are omitted from the following description for simplification of the same.

As is seen from FIG. 4, in this second embodiment 200, a second upper wall portion 18A, a first flange portion 11A and a second flange portion 17A are different from the second upper wall portion 18, the first flange portion 11 and the second flange portion 17 of the first embodiment 100.

That is, as shown, the second upper wall portion 18A is shaped like a bellows. With this, the flexibility of the wall portion 18A is much higher than the wall portion 18 of the first embodiment 100. This means much easy mating of the first and second flange portions 11A and 17A.

Furthermore, in this second embodiment 200, the mating between the first and second flange portions 11A and 17A is made through mutually engaged stepped surfaces 32 and 33. That is, the first flange portion 11A has a single stepped surface 32 and the second flange portion 17A has a double stepped surface 33, and upon mating of the first and second flange portions 11A and 17A in the pocket of the bracket 20, these stepped surfaces 32 and 33 are intimately engaged with each other in a so-called dove-tail connection manner, and respective front surfaces 11a and 17a of the first and second flange portions 11A and 17A are pressed against the dash panel 3 and a rear surface 17b of the second flange potion 17A is pressed against a rear wall of the pocket. The front surface 17A of the second flange portion 17A has the seal lips 14 pressed against the dash panel 3. As shown, in such condition, a rear surface 11b of the first flange portion 11A defines a front wall of the cylindrical clearance 19.

Due to employment of the stepped surfaces 32 and 33 for the mating of the first and second flange portions 11A and 17A, the sealing between these flanges portions 11A and 17A is assured, and due to the dove-tail connection between the two stepped surfaces 32 and 33, the mutual positioning therebetween is much assured.

Referring to FIG. 5, there is partially shown a steering shaft boot 300 which is the third embodiment of the present invention. It is to be noted that the part shown by this drawing is a portion that corresponds to the portion indicated by arrow "V" of FIG. 4.

Since the boot 300 of this embodiment is similar to the boot 200 of the second embodiment, only parts or portions that are substantially different from those of the second embodiment 200 will be described in the following.

As is seen from FIG. 5, in this third embodiment 300, first and second flange portions 11B and 17B are different from the first and second flange portions 11A and 17A of the second embodiment 200.

That is, as shown, the first flange portion 11B has a single stepped surface 42 and the second flange portion 17B has also a single stepped surface 43, and upon mating of the first and second flange portions 11B and 17B, these stepped surfaces 42 and 43 are intimately engaged with each other. Furthermore, in this third embodiment 300, the second flange portion 17B is formed with a larger annular seal lip 44 that extends along an outer periphery of the second flange portion 17B. With this lip 44, the hermetical sealing between the dash panel 3 and the boot 300 is much improved.

The entire contents of Japanese Patent Application 2005-59932 filed Mar. 4, 2005 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A steering shaft boot of a molded elastic material for use with a steering shaft that passes through an opening formed in a panel member, comprising:

an inner boot portion including a first cylindrical portion that is adapted to cover the steering shaft, a first flange portion that extends radially outward from one axial end of the first cylindrical portion and is adapted to be secured to the panel member and a first upper wall portion that extends radially inward from the other axial end of the first cylindrical portion and is adapted to be put on an outer surface of the steering shaft; and an outer boot portion including a second cylindrical portion that covers the first cylindrical portion while keeping a certain clearance therebetween, a second flange portion that extends radially outward from one axis end of the second cylindrical portion and is adapted to be secured to the panel member and a second upper wall that extends radially inward from the other axial end of the second cylindrical portion to the other axial end of the first cylindrical portion, wherein the first and second flange portions are separate in construction, and wherein the inner and outer boot portions are integrated with each other and produced through a molding.

2. A steering shaft boot as claimed in claim 1, in which the separation of the first and second flange portions is made at the time when the molding is operatively carried out.

3. A steering shaft boot as claimed in claim 1, in which the first and second flange portions are respectively formed with stepped surfaces which are intimately engageable.

4. A steering shaft boot as claimed in claim 1, in which the first upper wall portion is formed with a circular opening through which the steering shaft is adapted to pass.

5. A steering shaft boot as claimed in claim 1, in which the second upper wall portion is shaped into a bellows.

6. A steering shaft boot as claimed in claim 1, in which the first flange portion is formed with an annular groove that is adapted to receive therein an annular projection formed on the panel member.

7. A steering shaft boot as claimed in claim 1, in which the first flange portion is formed with at least one annular seal lip that is adapted to be pressed against the panel member.

8. A steering shaft boot as claimed in claim 1, in which the first and second flange portions are formed with respective bolt openings that are aligned when the first and second flange portions are put on each other.

9. A steering shaft boot as claimed in claim 1, in which the steering shaft boot is made of a molded thermoplastic resin having a specific gravity ranging from approximately 1.4 to approximately 1.7.

10. A steered vehicle structure comprising:

a panel member having an opening;

a steering shaft that passes through the opening of the panel member;

a steering shaft boot of a molded elastic material, the steering shaft boot comprising an inner boot portion including a first cylindrical portion that covers the steering shaft, a first flange portion that extends radially outward from one axial end of the first cylindrical portion and is secured to the panel member and a first upper wail portion that extends radially inward from the other axial end of the first cylindrical portion and is put on an outer surface of the steering shaft, and an outer boot portion including a second cylindrical portion that covers the first cylindrical portion while keeping a certain clearance therebetween, a second flange portion that extends radially outward from one axis end of the second cylindrical portion and is secured to the panel member and a second upper wall that extends radially inward from the other axial end of the second cylindrical portion to the other axial end of the first cylindrical portion, the first and second flange portions being separate in construction; and a bracket secured to the panel member to define therebetween a pocket into which mutually contacting parts of the first and second flange portions are tightly received, wherein the inner and outer boot portions are integrated with each other and produced through a molding.

* * * * *